(12) United States Patent
Kurono et al.

(10) Patent No.: US 9,438,082 B2
(45) Date of Patent: Sep. 6, 2016

(54) ROTARY ELECTRIC MACHINE

(75) Inventors: Yosuke Kurono, Miyoshi (JP);
Tatsuhiko Mizutani, Toyota (JP)

(73) Assignee: Toyota Jidosha Kabushiki Kaisha,
Toyota-shi, Aichi-ken (JP)

( * ) Notice: Subject to any disclaimer, the term of this patent is extended or adjusted under 35 U.S.C. 154(b) by 250 days.

(21) Appl. No.: 14/236,646

(22) PCT Filed: Jul. 30, 2012

(86) PCT No.: PCT/IB2012/001466
§ 371 (c)(1),
(2), (4) Date: Feb. 3, 2014

(87) PCT Pub. No.: WO2013/021248
PCT Pub. Date: Feb. 14, 2013

(65) Prior Publication Data
US 2015/0015095 A1    Jan. 15, 2015

(30) Foreign Application Priority Data
Aug. 8, 2011 (JP) ................................ 2011-173315

(51) Int. Cl.
*H02K 5/22* (2006.01)
*H02K 5/20* (2006.01)
*H02K 3/24* (2006.01)
*H02K 3/50* (2006.01)
*H02K 9/19* (2006.01)

(52) U.S. Cl.
CPC ................ *H02K 5/225* (2013.01); *H02K 3/24* (2013.01); *H02K 3/50* (2013.01); *H02K 5/20* (2013.01); *H02K 9/19* (2013.01)

(58) Field of Classification Search
CPC ............ H02K 3/24; H02K 3/50; H02K 5/20; H02K 5/225; H02K 9/19
USPC ................................................ 310/54, 58, 59
See application file for complete search history.

(56) References Cited

U.S. PATENT DOCUMENTS

| 5,034,644 | A | * | 7/1991 | Kech | ........................ | H02K 3/12 |
| | | | | | | 310/208 |
| 5,101,128 | A | * | 3/1992 | Veronesi | .................. | B63H 5/14 |
| | | | | | | 290/52 |
| 6,288,460 | B1 | * | 9/2001 | Fakult | ...................... | H02K 3/24 |
| | | | | | | 310/179 |

(Continued)

FOREIGN PATENT DOCUMENTS

| JP | 07111749 A | * | 4/1995 |
| JP | 2005-229672 | | 8/2005 |

(Continued)

OTHER PUBLICATIONS

Translation of foreign document JP 2005229672 A (Year: 2005).*

*Primary Examiner* — Alex W Mok
(74) *Attorney, Agent, or Firm* — Finnegan, Henderson, Farabow, Garrett & Dunner, LLP

(57) ABSTRACT

A rotary electric machine includes a coil portion of the stator coil that protrudes from an end of a stator core, a terminal module that is provided on a top of the coil portion on an axial end of the coil portion and that electrically connects the stator coil and an external electric device, and a cover unit in which a cover that covers the terminal module and a guide that guides a coolant to the coil portion are formed together into one piece. The guide is provided on each of circumferentially opposite sides of the cover to supply a coolant to the coil portion in a distributed manner.

11 Claims, 5 Drawing Sheets

(56) References Cited

U.S. PATENT DOCUMENTS

| | | | | |
|---|---|---|---|---|
| 6,815,848 | B1* | 11/2004 | Glew | H02K 5/20 310/402 |
| 7,952,240 | B2* | 5/2011 | Takenaka | H02K 1/20 310/260 |
| 8,269,382 | B2* | 9/2012 | Nakamori | H02K 1/20 310/52 |
| 2006/0175914 | A1* | 8/2006 | Takeda | F04B 39/12 310/54 |
| 2008/0035399 | A1* | 2/2008 | Murata | B60K 7/0007 180/65.51 |
| 2009/0184591 | A1 | 7/2009 | Hoshino et al. | |
| 2010/0244594 | A1* | 9/2010 | Murakami | H02K 5/20 310/54 |
| 2011/0180239 | A1 | 7/2011 | Sugimoto et al. | |

FOREIGN PATENT DOCUMENTS

| | | |
|---|---|---|
| JP | 2006-296103 | 10/2006 |
| JP | 2007-228667 | 9/2007 |
| JP | 2009-290921 | 12/2009 |
| JP | 2010-28882 | 2/2010 |

\* cited by examiner

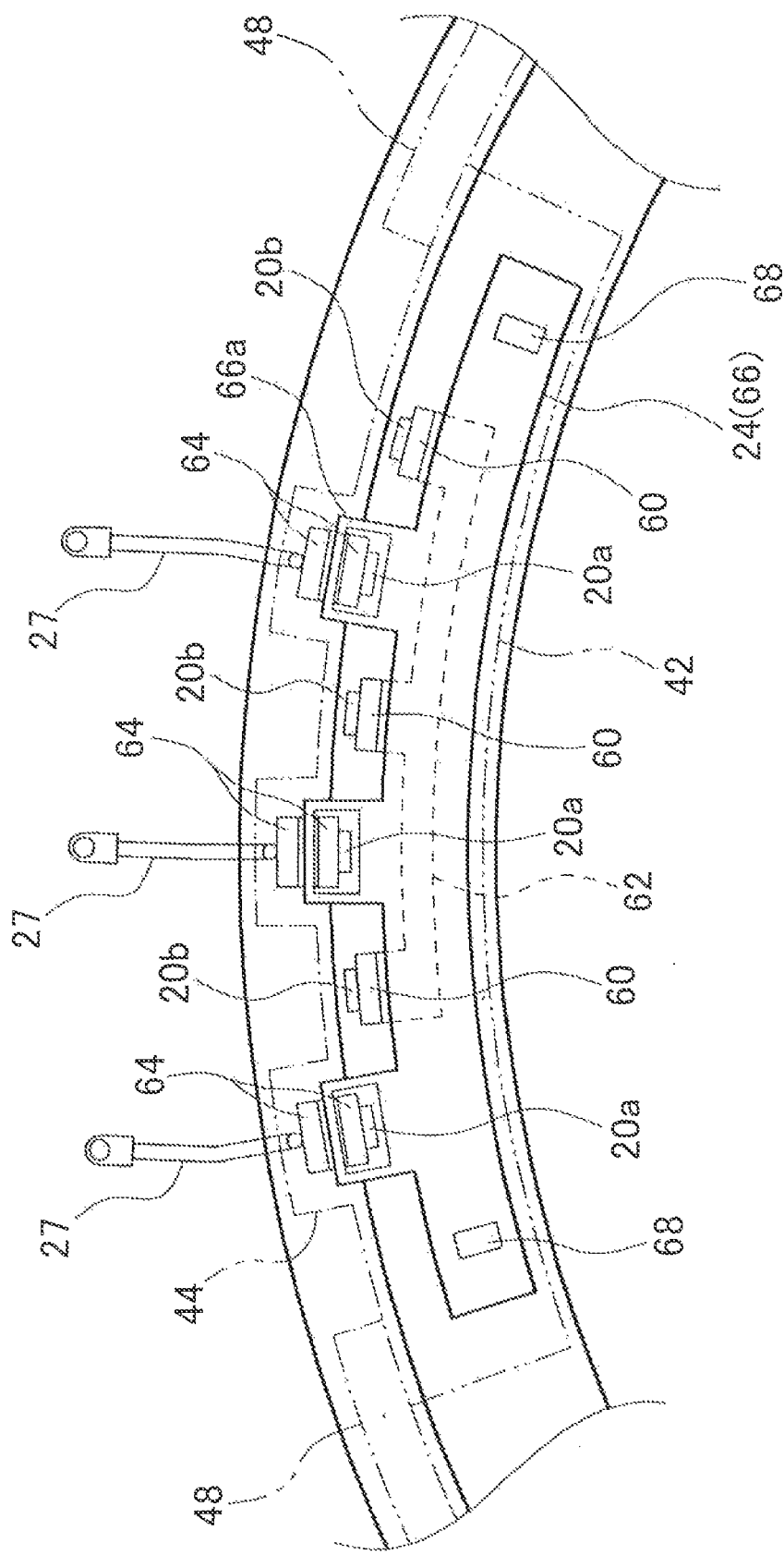

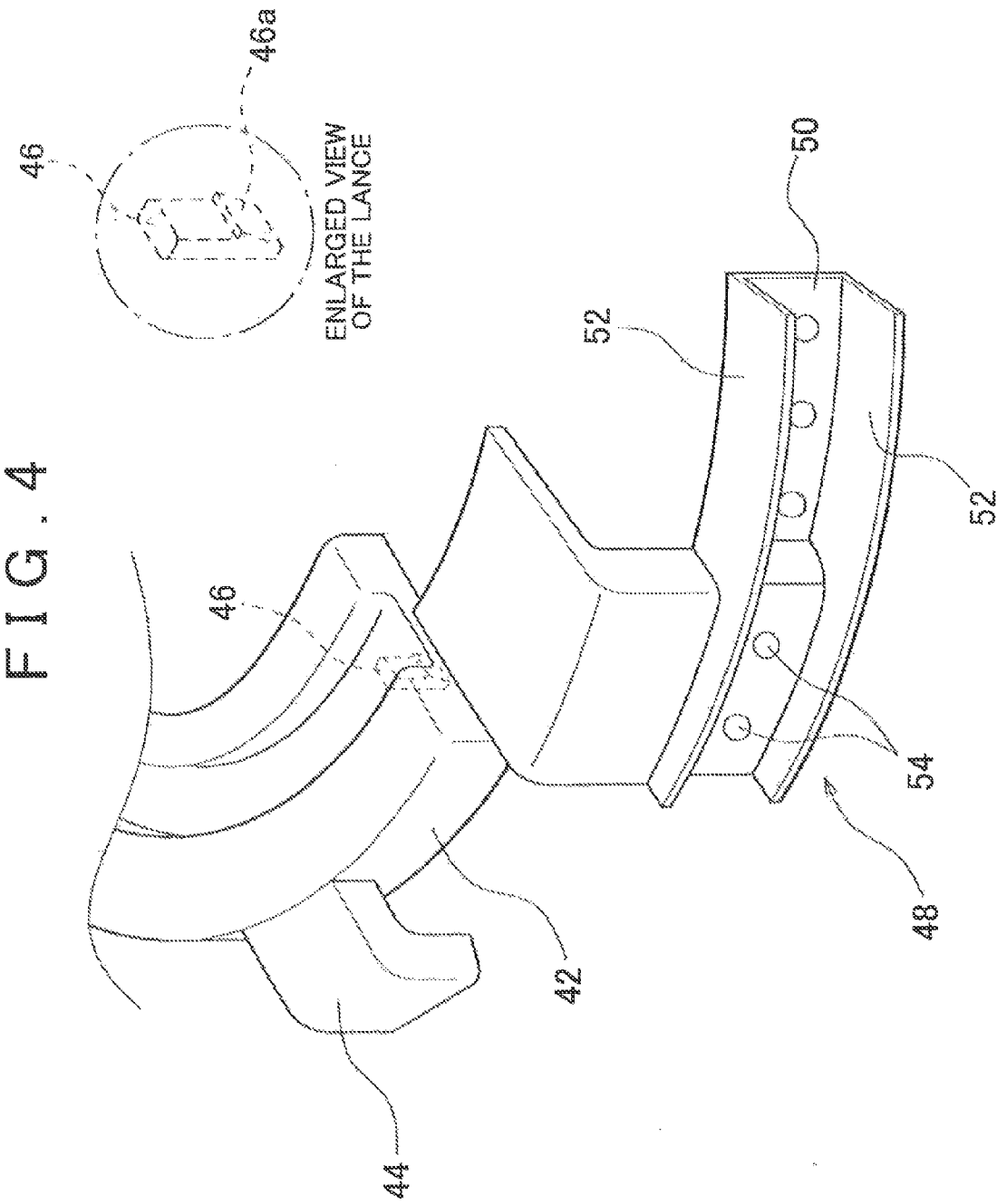

ROTARY ELECTRIC MACHINE

CROSS-REFERENCE TO RELATED APPLICATIONS

This application is a national phase application of International Application No. PCT/IB2012/001466, filed Jul. 30, 2012, and claims the priority of Japanese Application No. 2011-173315, filed Aug. 8, 2011, the content of both of which is incorporated herein by reference.

BACKGROUND OF THE INVENTION

1. Field of the Invention

The present invention relates to a rotary electric machine that includes a cover unit that covers a terminal module that electrically connects a stator coil and an external electric device.

2. Description of Related Art

A stator in which a stator coil is wound around a stator core is provided in a rotary electric machine. The stator coil that protrudes from an end of the stator core forms a coil end. On the coil end, a terminal module is provided to electrically connect the stator coil and an external electric device (for example, a secondary battery). Accordingly, there have been demands for a construction to mechanically and electrically protect the terminal module.

When functioning as an electric motor, the rotary electric machine energizes the stator coil to rotate a rotor. When functioning as a power generator, the rotary electric machine discharges a current that flows through the stator coil as the rotor rotates. That is, a current flows through the stator coil in either case where the rotary electric machine functions as an electric motor or a power generator. When a current flows through the stator coil, the stator core and the stator coil generate heat. As conventionally known, unless the heat is removed, this heat adversely affects operating efficiency of the rotary electric machine. Therefore, there have also been demands for measures to effectively cool the stator coil.

As a conventional technique for protecting the terminal module, molding the terminal module with resin is disclosed in Japanese Patent Application Publication No. 2009-290921 (JP 2009-290921 A), for example. In addition, a resin molding technique for protecting a member that needs to be mechanically and electrically protected, such as a substrate on which electronic components are mounted and which is attached to a stator of an electric motor, is also disclosed in Japanese Patent Application Publication No. 2007-228667 (JP 2007-228667 A).

Also, conventional techniques for efficiently cooling the stator core are disclosed in Japanese Patent Application Publications No. 2005-229672 (JP 2005-229672 A), No. 2010-28882 (JP 2010-28882 A), No. 2006-296103 (JP 2006-296103 A) and so on. According to the technique disclosed in JP 2005-229672 A, a coolant bath that reserves a coolant is provided on a top of the coil end to supply the coolant to the coil end. According to the technique disclosed in JP 2010-28882 A, a coolant flow passage is formed on a terminal block that tends to interfere with a coolant flow. According to the technique disclosed in JP 2006-296103 A, a part of a motor case protrudes radially outward to form a terminal box for power line connection, and a refrigerant flow passage is formed on a radially inner side of the terminal box.

Theoretically, when these techniques are combined, mechanical and electrical protection of the terminal module and efficient cooling of the stator coil can both be achieved. However, in either of the related techniques, a mechanism for efficiently cooling the stator coil and a mechanism for protecting the terminal module are provided separately from each other. Therefore, there is a problem in that it takes time and effort to attach the protecting mechanism and the cooling mechanism. In addition, because the cooling mechanism is provided independently of the position of the terminal module (the positions of terminals), in many cases, an area around the terminals, where a large amount of heat is generated, cannot be cooled efficiently.

SUMMARY OF THE INVENTION

The present invention therefore provides a rotary electric machine that allows a cooling mechanism and a mechanism for protecting a terminal module to be easily attached and that allows efficient cooling.

A rotary electric machine according to a first aspect of the present invention is directed to a rotary electric machine that includes a rotor that rotates about a shaft, and a stator that has a stator core and a stator coil, the rotary electric machine being placed such that the shaft extends generally horizontally, the rotary electric machine including: a coil portion of the stator coil that protrudes from an end of the stator core; a terminal module that is provided on a top portion of the coil portion at an axial end of the coil portion and that electrically connects the stator coil and an external electric device; and a cover unit in which a cover that covers the terminal module and a guide that guides a coolant to the coil end are formed together into one piece.

In the rotary electric machine according to the first aspect of the invention, the guide may guide a coolant that is supplied from above the guide to the coil portion.

In addition, in the rotary electric machine according to the first aspect of the invention, the guide may have a groove that extends along an outer periphery of the coil portion.

Further, in the rotary electric machine according to the first aspect of the invention, at least one hole that permits a coolant to pass through may be formed on a surface of the guide, which faces the outer periphery of the coil portion.

Still further, in the rotary electric machine according to the first aspect of the invention, the guide may have a plurality of the holes, and these holes may include a first hole that has a first diameter and a second hole that has a diameter different from the first diameter.

Still further, in the rotary electric machine according to the first aspect of the invention, a plurality of the guides may be provided, and these guides may be a first guide that extends in a first circumferential direction of the rotor and a second guide that extends in a second direction opposite to the first direction.

Still further, in the rotary electric machine according to the first aspect of the invention, the guide may be provided on an outer side of the cover in a radial direction of the shaft.

In the rotary electric machine according to the first aspect of the invention, the cover may include an attachment portion that is used to attach the cover unit to the terminal module.

In addition, in the rotary electric machine according to the first aspect of the invention, the attachment portion may be an engaged portion that is engaged with a part of the terminal module.

Still further, in the rotary electric machine according to the first aspect of the invention, a part of the cover unit, which covers a connecting portion that electrically connects the stator coil and the external electric device, may be made of an insulating material, and the other part of the cover unit may be subjected to powder coating on a surface of the cover unit to secure insulating properties.

According to the first aspect of the invention, the cover and the guide are formed together into one piece. This allows the cooling mechanism and the mechanism for protecting the terminal module to be attached in a single attachment process. In addition, the terminal module and consequently terminals are provided on the top of the coil end. This allows an area around the terminals, where a large amount of heat is generated, to be efficiently cooled.

Further, a rotary electric machine according to a second aspect of the present invention is directed to a rotary electric machine that includes a rotor that rotates about a shaft, and a stator that has a stator core and a stator coil, the rotary electric machine being placed such that the shaft extends generally horizontally, the rotary electric machine including: a coil end that protrudes from an end of the stator core; a terminal module that is provided on a top of the coil end on an axial end of the coil end and that electrically connects the stator coil and an external electric device; and a cover unit in which a cover that covers the terminal module and a flow passage that extends along an outer periphery of the coil end are formed together into one piece.

According to the second aspect of the invention, the cover and the flow passage are formed together into one piece. This allows the cooling mechanism and the mechanism for protecting the terminal module to be attached in a single attachment process. In addition, the terminal module and consequently terminals are provided on the top of the coil end. This allows an area around the terminals, where a large amount of heat is generated, to be efficiently cooled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 illustrates how a terminal module is mounted;

FIG. 4 is a partial perspective view of a cover unit;

DETAILED DESCRIPTION OF EMBODIMENTS

Figure 1:
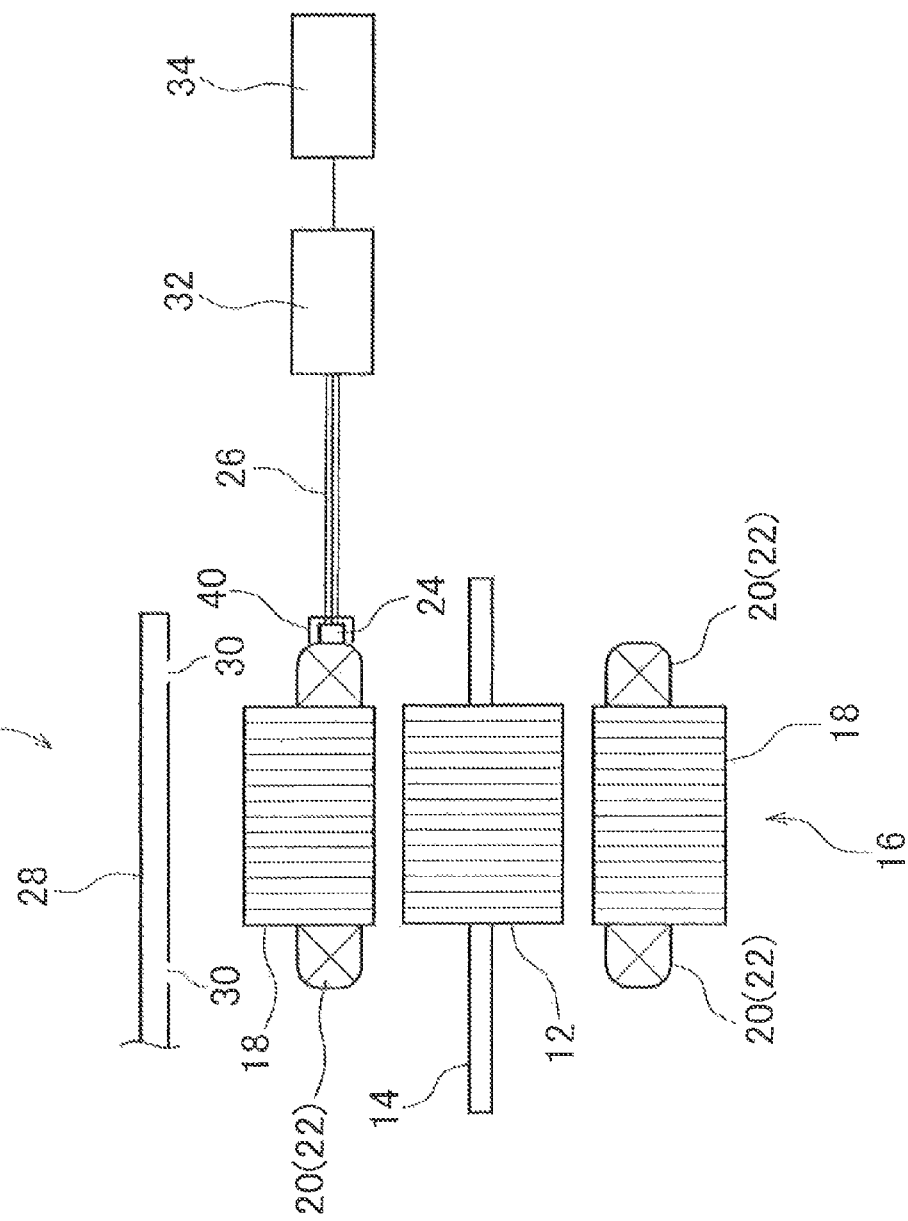
FIG. 1 is a schematic diagram of a rotary electric machine according to an embodiment of the present invention.

An embodiment of the present invention will be described below with reference to the accompanying drawings. FIG. 1 is a schematic diagram of a rotary electric machine 10 according to the embodiment of the present invention. The rotary electric machine 10 is a motor generator that has a function of an electric motor and a function of a power generator, and is installed in a hybrid vehicle, for example.

The rotary electric machine 10 has a rotor 12 and a stator 16. The rotor 12 is attached to a shaft 14. The shaft 14 is rotatably supported by a case (not shown) through a bearing. The rotary electric machine 10 is placed such that the shaft 14 extends horizontally. The rotor 12 is fixed to the shaft 14 and is provided to be rotatable together with the shaft 14.

The stator 16 has an annular shape, and is provided around the rotor 12 and located along an outer periphery of the rotor 12.

The stator 16 includes a stator core 18 and a stator coil 20 as main components. The stator core 18 has a plurality of teeth that protrude radially inward. A slot is formed between the adjacent teeth and is open radially inward. The stator coil 20 is wound around each of the teeth. A part of the stator coil 20 protrudes from each end of the stator core 18 to form a coil end (coil portion) 22. A terminal module 24 is provided on an axial end surface of the coil end 22 and electrically connects the stator coil 20 and an external electric device. In the present embodiment, a cover unit 40 is mounted on the terminal module 24 to electrically and mechanically protect the terminal module 24. This will be described later.

The stator coil 20 is electrically connected to a power control unit (PCU) 32 by a three-phase cable 26 through the terminal module 24. The three-phase cable 26 includes a U-phase cable, a V-phase cable, and a W-phase cable. The stator coil 20 includes a U-phase stator coil, a V-phase stator coil, and a W-phase stator coil. One ends of these three-phase stator coils 20 connect respectively to the U-phase cable, the V-phase cable, and the W-phase cable through the terminal module 24. The other ends of these three-phase stator coils 20 are connected with each other through the terminal module 24 to form a neutral point. The PCU 32 is electrically connected to a battery 34 by a feeding cable, so that the battery 34 and the stator 16 are electrically connected.

When the rotary electric machine 10 is installed in the hybrid vehicle, a driving force is output from the rotary electric machine 10 that includes the rotor 12 and the stator 16, and is transmitted as a rotational force to drive wheels via a speed-reducing mechanism, a differential mechanism, a drive shaft, and so on to allow the hybrid vehicle to run. In contrast, when the hybrid vehicle is under regenerative braking, the drive wheels are rotated by an inertial force of a vehicle body. The rotational force of the drive wheels is transmitted to the rotary electric machine 10 via the drive shaft, the differential mechanism, the speed-reducing mechanism, and so on to drive the rotary electric machine 10. At this time, the rotary electric machine 10 operates as a power generator. Electric power is generated by the rotary electric machine 10 and is stored in the battery 34 via an inverter in the PCU 32.

When the rotary electric machine 10 is in operation, a resistance of a lead 27 that forms the stator coil 20 causes part of electrical energy to be converted into thermal energy, and accordingly, the stator coil 20 generates heat. The rotary electric machine 10 is provided with a mechanism for supplying a coolant to a surface of the coil end 22 to prevent an increase in temperature due to the heat generated by the stator coil 20. In this mechanism a pipe 28 through which a coolant flows is provided and placed in parallel to the shaft 14. This pipe 28 is formed with an oil hole 30 through which a coolant is discharged to the coil end 22. A coolant drops through the oil hole 30 and passes through the coil end 22, so that the coil end 22 (consequently, the stator coil 20) is cooled. The coolant that passes through the coil end 22 is reserved at a bottom of the case. This coolant that is reserved at the bottom of the case is drawn by a pump (not shown) and is supplied back to the pipe 28. In the present embodiment, a guide 48 is provided in the cover unit 40. The guide 48 efficiently guides a coolant that is supplied from the pipe 28 to the coil end 22 in a distributed manner.

Figure 2:
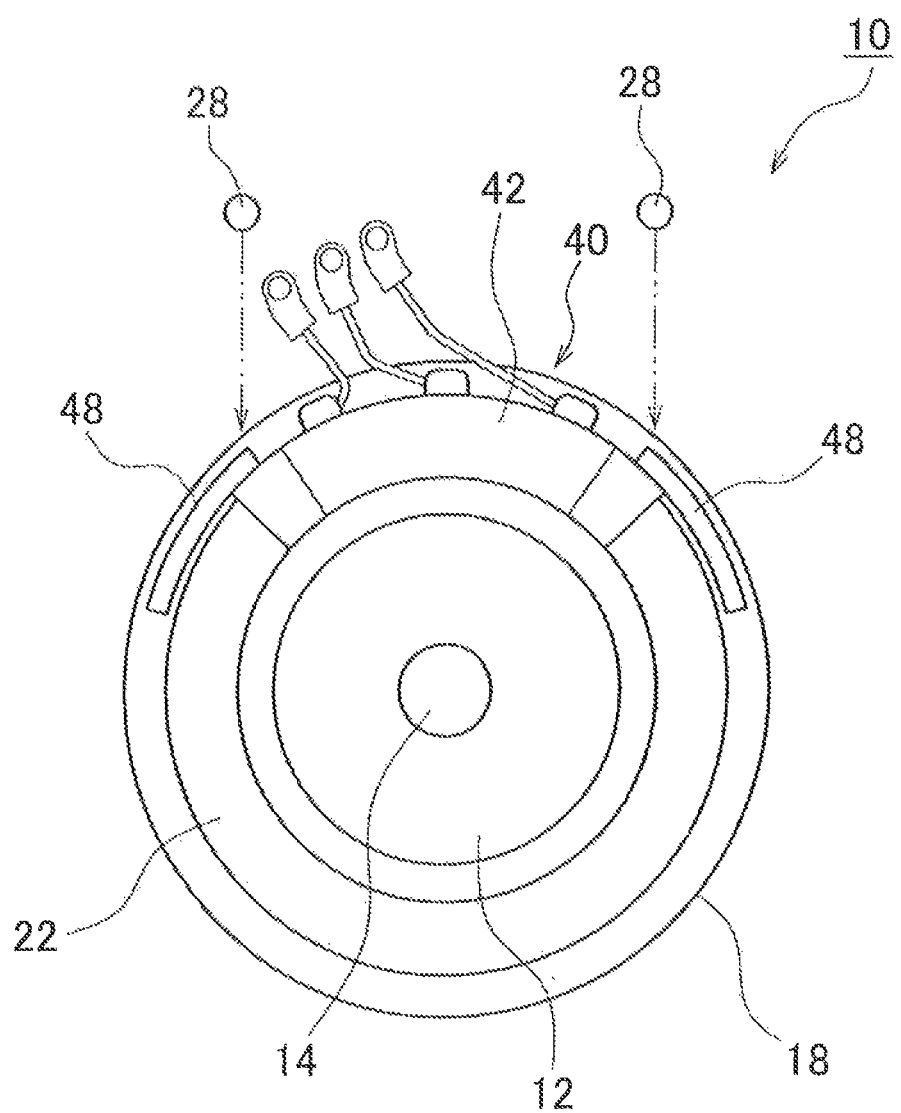
FIG. 2 is a schematic front view of the rotary electric machine.
Figure 5A:
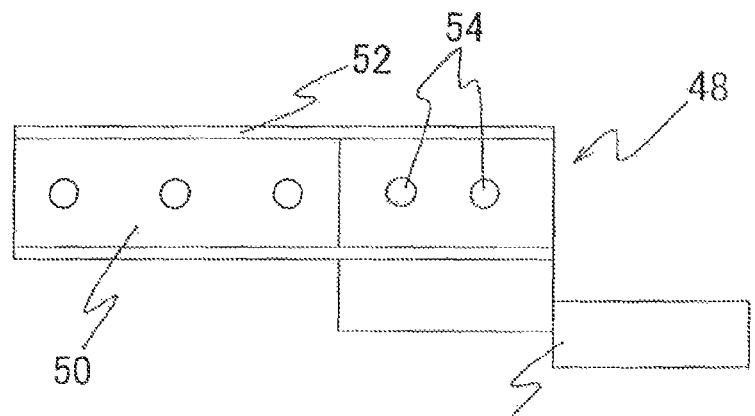
FIG. 5A is a partial side view of the cover unit.
Figure 5B:
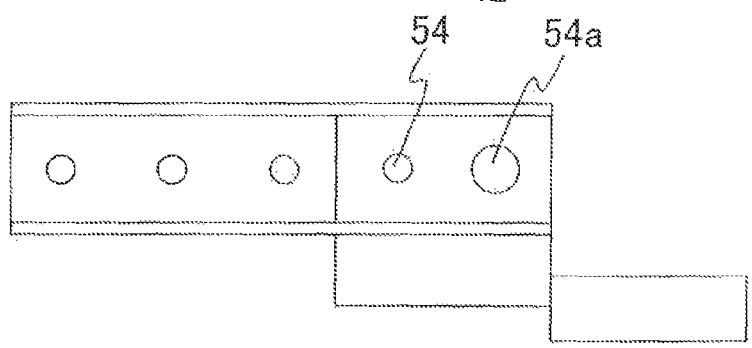
FIG. 5B is a partial side view of the cover unit.
Figure 5C:
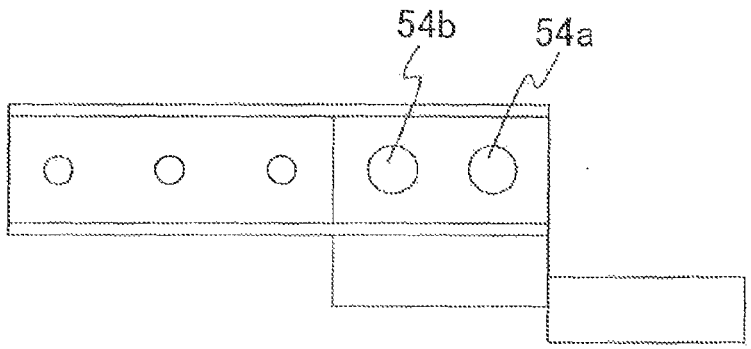
FIG. 5C is a partial side view of the cover unit.

A construction of the cover unit 40 will next be described with reference to FIGS. 2 to 5C. FIG. 2 is a schematic front view of the rotary electric machine 10. FIG. 3 illustrates how the terminal module 24 is mounted. FIG. 4 is a partial perspective view of the cover unit 40. FIGS. 5A to 5C each are a partial side view of the cover unit.

As shown in FIG. 2, the cover unit 40 is provided near the top of the coil end 22 in the present embodiment. The cover unit 40 is a member in which a cover 42 and the guide 48 are formed together into one piece. The cover 42 electrically and mechanically protects the terminal module 24. The guide 48 guides a coolant flow. In the present embodiment, the entire cover unit 40 is formed of a heat-resistant insulating material. When there is a problem with cost and so on, a part of the cover unit 40, which covers terminals, may only be formed of an insulating material, while the other part of the cover unit 40 may be formed of a low-cost non-insulating material and a surface of the non-insulating material may be subjected to coating (for example, powder coating) to secure insulating properties. This construction allows an area around the terminals, where high insulating properties are required, to be reliably insulated and allows the other area to provide a certain level of insulating performance at low cost.

The cover 42 is mounted on the terminal module 24 to cover the terminal module 24. The terminal module 24 is a module that electrically connects the stator coil 20 that is wound on the stator 16 to the external electric device (such as the battery 34). The terminal module 24 is placed on the axial end surface of the coil end 22. Various configurations may be employed for the terminal module 24. However, as shown in FIG. 3, the terminal module 24 of the present embodiment includes module-side terminals 64 that connect respectively to one ends 20a of the three-phase stator coils 20, neutral-point terminals 60 that connect respectively to the other ends 20b of these three-phase stator coils 20, and a holder 66 that holds these terminals 60 and 64.

The holder 66 is a generally arch-shaped member formed of an insulating material. A neutral-point busbar 62 is provided in an interior of the holder 66. The holder 66 includes three terminal holding portions 66a that are arranged in a circumferential direction on an outer peripheral end of the holder 66. The terminal holding portions 66a hold the module-side terminals 64. The holder 66 has engaging holes 68 that are formed proximate to its circumferentially opposite ends and that are used to connect with the cover unit 40.

The total three module-side terminals 64 are provided respectively for the three phases and are each formed of a conductive metal material that is bent into a general U-shape. The module-side terminals 64 each have one side surface that connects to the one end 20a of the stator coil 20, and have the other side surface that connects to the lead 27 that is used to connect to the external electric device.

The total three neutral-point terminals 60 are also provided respectively for the three phases. The neutral-point terminals 60 and the neutral-point busbar 62 are formed of a conductive material, and are formed together into one piece. The neutral-point terminals 60 protrude radially outward from an outer peripheral edge of the neutral-point busbar 62, and each have a side surface that connects to the other end 20b of the stator coil 20. The three-phase stator coils 20 are connected together at a neutral point through the neutral-point terminals 60 and the neutral-point busbar 62.

In the present embodiment, the rotary electric machine 10 is placed such that the terminal module 24, and consequently, an end of the stator coil 20 are positioned on a top of the stator 16, for the purpose of efficiently cooling the stator coil 20. This will be described in details later.

It is apparent from the foregoing descriptions that a multiplicity of the terminals 60 and 64 for electrical connection are provided in the area around the terminal module 24, and accordingly, this area is required to be insulated. Therefore, the entire terminal module 24 is covered by the cover 42 of the cover unit 40 to insulate the area around the terminals 60 and 64.

The cover 42 has a general arch shape that matches the shape of the terminal module 24 to cover the entire terminal module 24. In the terminal module 24, the module-side terminals 64 protrude radially far outward of the terminal module 24, and accordingly, the cover 42 is provided with protrusions 44 that cover the protruding module-side terminals 64.

The cover unit 40 is attached to the terminal module 24 through a lance 46 (see FIG. 4) that is formed to protrude from a back surface of the cover 42. The lance 46 functions as an engaged portion that is engaged with a part of the terminal module 24. The lance 46 is provided on each of circumferentially opposite ends of the cover 42, and includes a return 46a that is formed proximate to a distal end of the lance 46. The return 46a has a wider step portion and is tapered from the step portion toward the distal end. When the lance 46 is inserted into the engaging hole 68 that is formed on the terminal module 24, the return 46a is engaged with (caught by) a peripheral edge of the engaging hole 68, so that the cover unit 40 is attached to the terminal module 24.

The guide 48 is provided at each of the circumferentially opposite ends of the cover 42. The guide 48 is a flow-passage forming member that guides a coolant supplied from above the guide 48 to the coil end 22 in a distributed manner. The guide 48 of the present embodiment is a groove member that extends along an outer peripheral surface of the coil end 22. The guide 48 has a general U-shape in cross section, and includes a bottom surface 50 that faces the outer peripheral surface of the coil end 22 and side walls 52 that rise from opposite sides of the bottom surface 50.

Figure 5D:
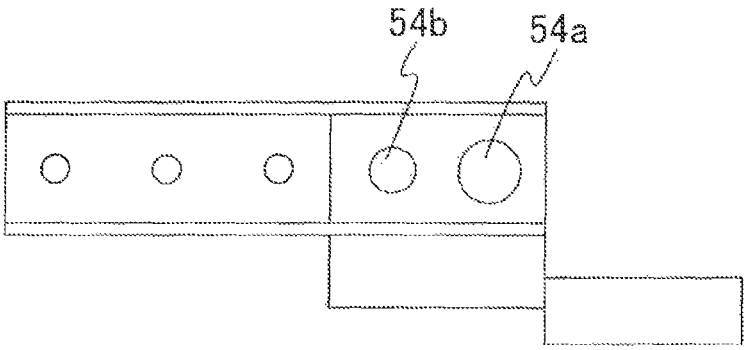
FIG. 5D is a partial side view of the cover unit.

The guide 48 is opened at its lower circumferential end. A coolant supplied to the guide 48 flows along the guide 48 and is then supplied from the lower circumferential end of the guide 48 to the peripheral surface of the coil end 22. A plurality of passage holes 54 that permit a coolant supplied to pass (leak) through are formed on the bottom surface 50 of the guide 48. Part of the coolant supplied to the guide 48 passes through the passage holes 54 and is supplied to the coil end 22. This construction allows the coolant to be supplied to the coil end 22 in a distributed manner over a wide area of the coil end 22, and allows the coil end 22 to be cooled more efficiently. The number and size of the passage holes 54 may be varied as appropriate to a desired manner of distribution of the coolant. For example, when a part of the coil end 22, which is located near an upper-end side of the guide 48, is desired to be cooled more intensively, the passage hole 54 near the upper-end side of the guide 48 may be formed to have a relatively large diameter so that a large amount of the coolant can be supplied from near the upper-end side of the guide 48. In this respect, detailed descriptions are made with reference to FIGS. 5A to 5D. FIGS. 5A to 5D each are a partial side view of the cover unit 40, when viewed from the direction perpendicular to the bottom surface 50 of the guide 48. FIG. 5A illustrates the cover unit 40 that corresponds to the cover unit 40 in FIG. 4, in which the passage holes 54 are all formed to have the same diameter. However, as shown in FIG. 5B, a passage hole 54a, one of the passage holes 54, which is positioned on the uppermost-end side (the cover side) of the guide 48, may be formed to have a diameter relatively larger than the diameter of the other passage holes 54, for example. Alternatively, as shown in FIG. 5C, in addition to the passage hole 54a positioned on the uppermost-end side (the cover side) of the guide, a passage hole 54b, one of the passage holes 54, which is positioned next to the passage hole 54a, may also be formed to have a relatively larger diameter so that the passage holes 54a and 54b have the same diameter. Further alternatively, as shown in FIG. 5D, although the passage holes 54a and 54b each may have a diameter relatively larger than the diameter of the other passage holes, the passage holes 54a and 54b may have different diameters from each other.

As shown in FIG. 2, the pipe 28 through which a coolant is supplied to the guide 48 is placed immediately above an upstream-side end of the guide 48. A coolant is discharged from the oil hole 30 that is provided on the pipe 28, and is supplied to the upstream-side end of the guide 48.

The guide 48 is formed together with the cover 42 into one piece. This simplifies a process of attachment of the cover 42 and the guide 48. That is, in the related techniques, the cover 42 that covers the terminal module 24 and the guide 48 that guides a coolant are formed separately from each other. This results in a need not only for a process of attaching the cover 42, but also for a process of attaching the guide 48. The guide 48 is attached by welding or other methods, for example. Therefore, as well as the process of attaching the cover, an additional process, including positioning the guide 48 and welding the guide 48, is also needed. It takes time and effort.

In contrast, in the present embodiment, the cover 42 and the guide 48 are formed together into one piece. Therefore, when the cover 42 is attached to the terminal module 24, the position of the guide 48 relative to the coil end 22 is fixed accordingly. Consequently, only the process of attaching the cover 42 needs to be performed, and no additional process is needed for attaching the guide 48, such as positioning and welding the guide 48. This simplifies the process of attaching the cover 42 and the guide 48.

As described above, the terminal module 24 is provided on the top of the coil end 22 in the present embodiment. The guide 48 that guides a coolant is provided on each of the circumferentially opposite sides of the cover that protects the terminal module 24. This construction allows the area around the terminals to be cooled from its opposite sides. That is, the area around the terminals generates a large amount of heat, and thus tends to have a higher temperature. A coolant is supplied through the guide 48 to each of the opposite sides of the area around the terminals, so that the area around the terminals is cooled more intensively. This effectively prevents a reduction in operating efficiency of the rotary electric machine due to a higher temperature in the area around the terminals.

The constructions described above are merely an example of the present invention. Therefore, as long as the cover 42 and the guide 48 are formed together into one piece and the terminal module 24 is provided on the top of the stator 16, the constructions may be otherwise modified or changed appropriately. For example, in the present embodiment, the guide 48 is connected to the circumferential end of the cover 42. However, the position of the guide 48 may be displaced toward the top of the stator 16 so that the guide 48 and the cover 42 partially overlap with each other in the circumferential direction. The number of the guides 48 is not limited to two, but may be one or more than two. For example, in addition to, or in place of, the two guides 48 that are provided on the circumferentially opposite sides of the cover 42, another guide that is positioned near the top of the stator 16 may be provided. In the present embodiment, the cover unit 40 is attached to the terminal module 24 by engagement using the lance 46. However, it should be understood that the cover unit 40 may also be attached to the terminal module 24 by other fixing methods, such as fitting and screwing.

The invention claimed is:

1. A rotary electric machine comprising:
    a rotor that rotates about a shaft;
    a stator that has a stator core and a stator coil;
    a coil portion of the stator coil that protrudes from an end of the stator core;
    a terminal module that is provided on a top portion of the coil portion at an axial end of the coil portion and that electrically connects the stator coil and an external electric device; and
    a cover unit in which a cover that covers the terminal module and a guide that guides a coolant to the coil end are formed together into one piece, wherein the cover covers the terminal module at each of an outwardly axial side, and outwardly radial side and an inwardly radial side of the terminal module so as to electrically and mechanically protect the terminal module,
    wherein the rotary electric machine being placed such that the shaft extends generally horizontally.

2. The rotary electric machine according to claim 1, wherein
    the guide guides a coolant that is supplied from above the guide to the coil portion.

3. The rotary electric machine according to claim 1, wherein
    the guide has a groove that extends along an outer periphery of the coil portion.

4. The rotary electric machine according to claim 1, wherein
    at least one hole that permits a coolant to pass through is formed on a surface of the guide, which faces the outer periphery of the coil portion.

5. The rotary electric machine according to claim 4, wherein the guide has a plurality of the holes, and these holes comprise a first hole that has a first diameter and a second hole that has a diameter different from the first diameter.

6. The rotary electric machine according to claim 1, wherein
    a plurality of the guides are provided, and these guides are a first guide that extends in a first circumferential direction of the rotor and a second guide that extends in a second direction opposite to the first direction.

7. The rotary electric machine according to claim 1, wherein
    the guide is provided on an outer side of the cover in a radial direction of the shaft.

8. The rotary electric machine according to claim 1, wherein
    the cover comprises an attachment portion for attaching the cover unit to the terminal module.

9. The rotary electric machine according to claim 8, wherein
    the attachment portion is an engaged portion that is engaged with a part of the terminal module.

10. The rotary electric machine according to claim 1, wherein
    a part of the cover unit, which covers a connecting portion that electrically connects the stator coil and the external electric device, is made of an insulating material, and the other part of the cover unit is subjected to powder coating on a surface of the cover unit to secure insulating properties.

11. A rotary electric machine comprising:
a rotor that rotates about a shaft;
a stator that has a stator core and a stator coil;
a coil portion of the stator coil that protrudes from an end of the stator core;
a terminal module that is provided on a top portion of the coil portion at an axial end of the coil portion and that electrically connects the stator coil and an external electric device; and
a cover unit in which a cover that covers the terminal module and a flow passage that extends along an outer periphery of the coil end are formed together into one piece, wherein the cover covers the terminal module at each of an outwardly axial side, an outwardly radial side and an inwardly radial side of the terminal module so as to electrically and mechanically protect the terminal module,
wherein the rotary electric machine being placed such that the shaft extends generally horizontally.

* * * * *